United States Patent
Walterson

[11] Patent Number: 5,960,577
[45] Date of Patent: Oct. 5, 1999

[54] DRIVE SYSTEM FOR HUNTING DECOYS

[76] Inventor: David Walterson, 204 W. 136th St., Burnsville, Minn. 55337

[21] Appl. No.: 09/157,683

[22] Filed: Sep. 21, 1998

[51] Int. Cl.$^6$ .................................................. A01M 31/06
[52] U.S. Cl. ....................................................................... 43/3
[58] Field of Search ................................ 43/2, 3; 40/417; 446/330, 352, 353

[56] References Cited

U.S. PATENT DOCUMENTS

| D. 384,598 | 10/1997 | Park | 40/417 |
|---|---|---|---|
| 547,553 | 10/1895 | Keller | 43/3 |
| 636,106 | 10/1899 | Biddle | 43/3 |
| 1,275,327 | 8/1918 | Uttz | 40/417 |
| 1,928,573 | 9/1933 | Saeder | 40/417 |
| 1,940,490 | 12/1933 | Frazier | 40/417 |
| 2,229,175 | 1/1941 | Johnson | 43/3 |
| 2,480,390 | 8/1949 | Thompson | 43/3 |
| 2,575,252 | 11/1951 | Berger | 40/417 |
| 2,576,209 | 11/1951 | Berger | 40/417 |
| 2,747,314 | 5/1956 | McGregor | 43/3 |
| 2,846,798 | 8/1958 | Polk | 40/417 |
| 2,849,823 | 9/1958 | Miller | 43/3 |
| 2,860,434 | 11/1958 | Kost et al. | 40/417 |
| 2,953,869 | 9/1960 | Collischan | 43/2 |
| 3,153,871 | 10/1964 | Semba | 40/417 |
| 3,916,553 | 11/1975 | Lynch et al. | 43/3 |
| 4,813,292 | 3/1989 | Boyko | 74/89.2 |
| 4,825,136 | 4/1989 | Farhat | 318/568.1 |
| 4,845,873 | 7/1989 | Hazlett | 43/3 |
| 4,896,448 | 1/1990 | Jackson | 43/3 |
| 5,144,764 | 9/1992 | Peterson | 43/3 |
| 5,546,692 | 8/1996 | Byers | 43/2 |
| 5,636,466 | 6/1997 | Davis | 43/3 |
| 5,775,022 | 7/1998 | Sumrall et al. | 43/3 |
| 5,809,683 | 9/1998 | Solomon | 43/3 |

FOREIGN PATENT DOCUMENTS 383031  11/1932  United Kingdom ............... 43/2

Primary Examiner—Michael J. Carone
Assistant Examiner—Darren W. Ark
Attorney, Agent, or Firm—Nikolai, Mersereau and Dietz, P.A.

[57] ABSTRACT

A drive system for animating a hunting decoy is designed to fit within the decoy's hollow body and provide movement to appendages, such as wings, on the decoy. The drive system comprises a battery-operated DC motor for imparting reciprocal movement of mounting pegs on which the appendages are affixed. The oscillating, reciprocating motion is provided by an eccentric that is coupled through flexible leaf spring links to the periphery of first and second wheels that are journaled for rotation on parallel axes. The leaf spring linkages function to counter-balance the weight of the appendages, reducing current drain on the motor.

11 Claims, 4 Drawing Sheets

DRIVE SYSTEM FOR HUNTING DECOYS

BACKGROUND OF THE INVENTION

I. Field of the Invention

This invention relates generally to hunting decoys and, more particularly, to a drive system for providing animation to such decoys.

II. Discussion of the Prior Art

Hunters frequently employ decoys when hunting game animals. For example, when hunting water fowl, a hunter will commonly set out a plurality of decoys in a pattern typical of that assumed by live birds so that the setting will appear natural to the species being hunted when viewed from a distance. The decoys are designed to resemble the water fowl species being hunted and, generally speaking, most decoys either sit stationary on land (as in the case of geese) or are anchored so as to float as a group on water as with ducks. For the most part, such decoys do not have movable parts.

The prior art does include decoys which are not totally immovable. For example, the U.S. Pat. No. 5,636,466 to Davis illustrates a goose decoy containing a radio controlled motor for causing the decoy's wing appendages to flap and for the decoy to move from a sitting position to a standing position. The Hazlett U.S. Pat. No. 4,845,873 patent describes a duck decoy incorporating an electric motor coupled to wing appendages for producing a flapping motion thereof. Various other patents have been granted in the past that incorporate either an electric motor or a string mechanism manipulated by the hunter to produce animation, such as wing and/or head movement.

When it is considered that electric motor drive systems for use in decoys generally deploy DC motors powered by batteries and that it is desirable that such batteries will provide sufficient current to power the appendages for prolonged periods of time, e.g. 12 hours at a stretch, it is imperative that the drive system be highly efficient and minimize torque demand on the motor. The present invention provides such a drive system.

SUMMARY OF THE INVENTION

In accordance with the present invention, there is provided an apparatus for animating a hunting decoy where the decoy is of the type having a hollow body and an appendage that is adapted to be moved relative to the hollow body. The drive system includes a mounting block affixed to a portion of the hollow body of the decoy and which projects inwardly into an interior of the hollow body. An electric motor and associated gear reduction box is attached to the mounting block and the gear reduction box has an output shaft supporting an eccentrically disposed drive shaft, which is journaled for rotation by suitable bearings in a connector block. When the motor is energized, the connector block follows an orbital circular path. A pair of wheel members are also journaled for rotation about bearings surrounding cylindrical posts affixed to the mounting block and a flat, flexible, spring member is used to link the connector block to a peripheral surface of the first and second wheels such that the wheels are made to oscillate with reciprocating motion through a predetermined arc as the connector block traverses its circular orbit. In accordance with one embodiment of the invention, means are provided for coupling appendages of the decoy to the pair of wheels, thereby imparting a swinging motion to the appendages when the motor is energized.

In the preferred embodiment, the appendages may be wings on a water fowl decoy and the weight of the wings are counter-balanced by the spring action provided by the flexible link member, which greatly reduces the output torque requirements necessary to drive the orbiting connector block. With the drive system of the present invention applied to a Canadian goose decoy whose wing appendages are each two feet in length, the wing tips were allowed to move up and down approximately 23 inches and required only about 0.595 in lbs. of torque on the motor to do so. Using a 9 volt transistor radio battery, the device was made to operate continuously for a period of 25 hours in a wind-free environment. By incorporating a remotely controlled switch for coupling the battery output to the motor, intermittent operation can be achieved, prolonging still further the life of the battery used in powering the appendage drive system.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
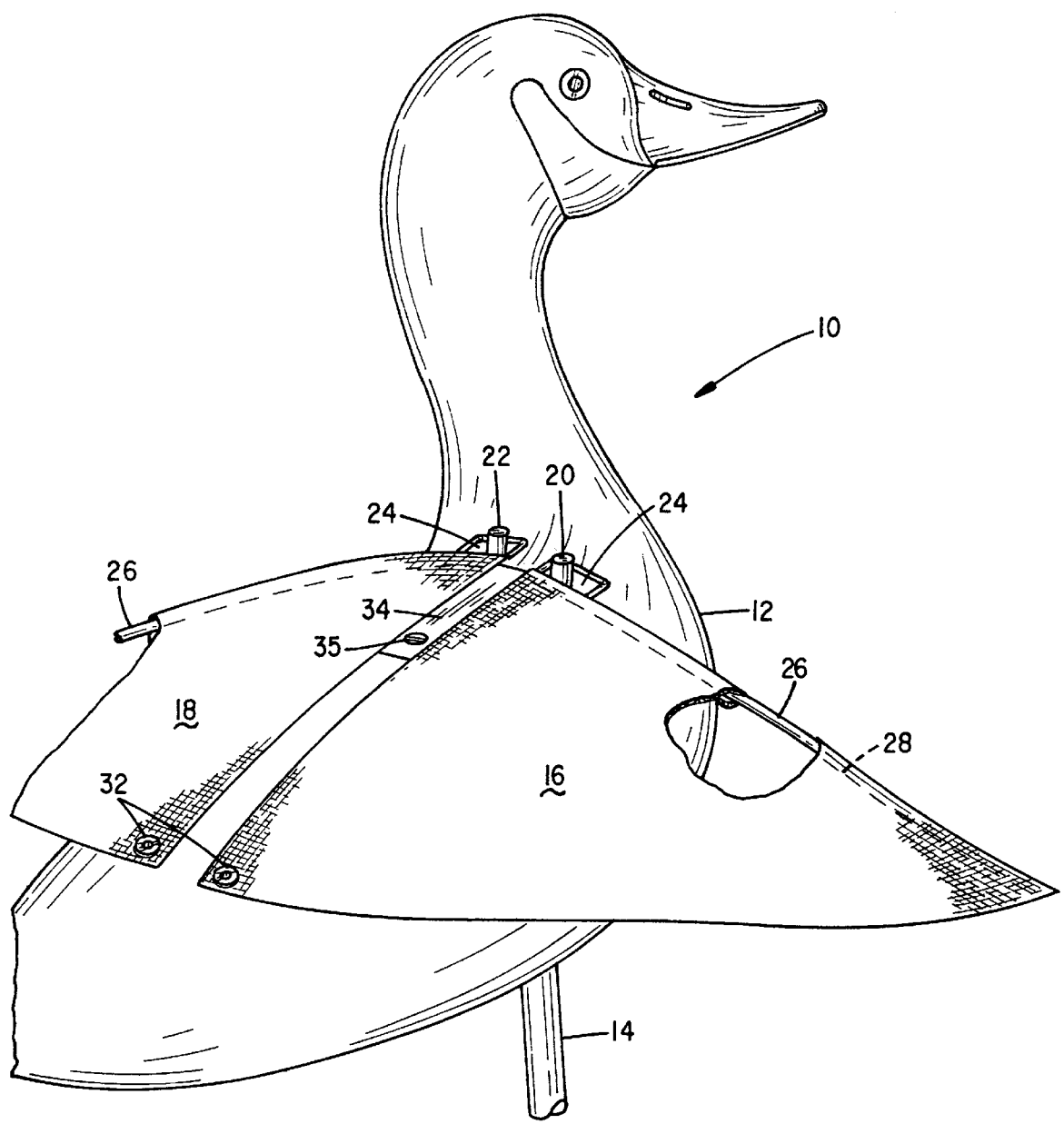
FIG. 1 is a perspective view of a hunting decoy having movable wing appendages.

Referring to the perspective view of FIG. 1, the hunting decoy is here shown as a Canadian goose. However, it is to be understood that the present invention can be applied to other hunting decoys, such as ducks and other water fowl or even to larger animals, such as deer, where it is desired to provide a degree of animation to the decoy. The goose decoy is indicated generally by numeral 10 and it is shown in a standing disposition with a body 12 supported by legs 14. First and second fabric wings 16 and 18 are affixed to mounting pegs 20 and 22, which project outwardly through a slot 24 formed in the back portion of the hollow, molded body 12 just behind the neck.

The wings 16 and 18 each include a lightweight, elongated, graphite stiffening spar 26 extending through a tubular hem 28 formed along one edge of the fabric 30, preferably Tyvek®, comprising the wing. The wing is curved along its opposite edge to simulate the shape of a goose wing and the wing fabric is secured to the body 12 proximate the tail thereof by means of snaps as at 32.

As will be explained in greater detail hereinbelow, the lightweight graphite stiffening ribs 26 of the wings connect to the mounting pegs 20 and 22 which are driven so as to move in a coordinated wig-wag fashion, either continuously or intermittently, to provide a more realistic appearance to live geese flying over the site where the decoys are placed by the hunter.

Figure 2:
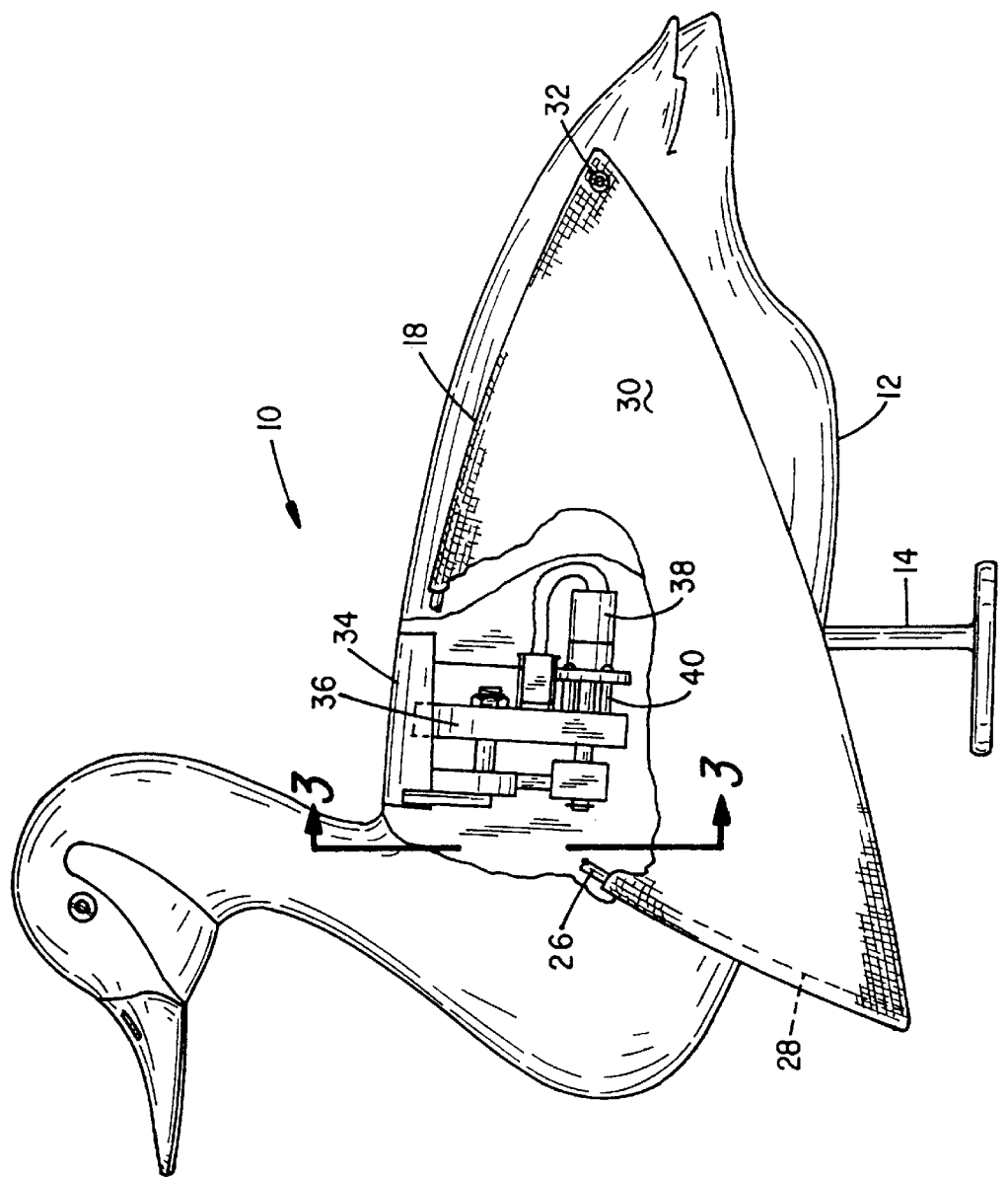
FIG. 2 is a side elevational view of a hunting decoy incorporating the improved drive system of the present invention.

Referring next to the side elevation of FIG. 2, a portion of the body 12 and wing 16 are broken away to reveal the positioning of the motor drive system of the present invention within the hollow body cavity of the decoy. A generally rectangular access panel 34 is provided in the decoy's back and fastened thereto by screws as at 35 is a generally rectangular mounting block 36 having a curved upper edge to conform to the curvature of the access panel 34 and the decoy's back surface at the location of the access opening. An electric, battery-operated DC motor 38 with an integral gear reduction box 39 is attached to the mounting block 36 by four stand-offs and screws as at 40. With no limitation intended, the motor 38 may comprise a Type CLL, 4 watt DC motor sold by Maxon Precision Motors, Inc. of Burlingame, Calif. The gear reduction box used with this motor provides a 100:1 reduction ratio. This motor provides adequate output torque with a relatively low current drain and is capable of being powered by a standard 9 volt transistor radio battery having a 0.5 ampere-hour rating.

Figure 4:
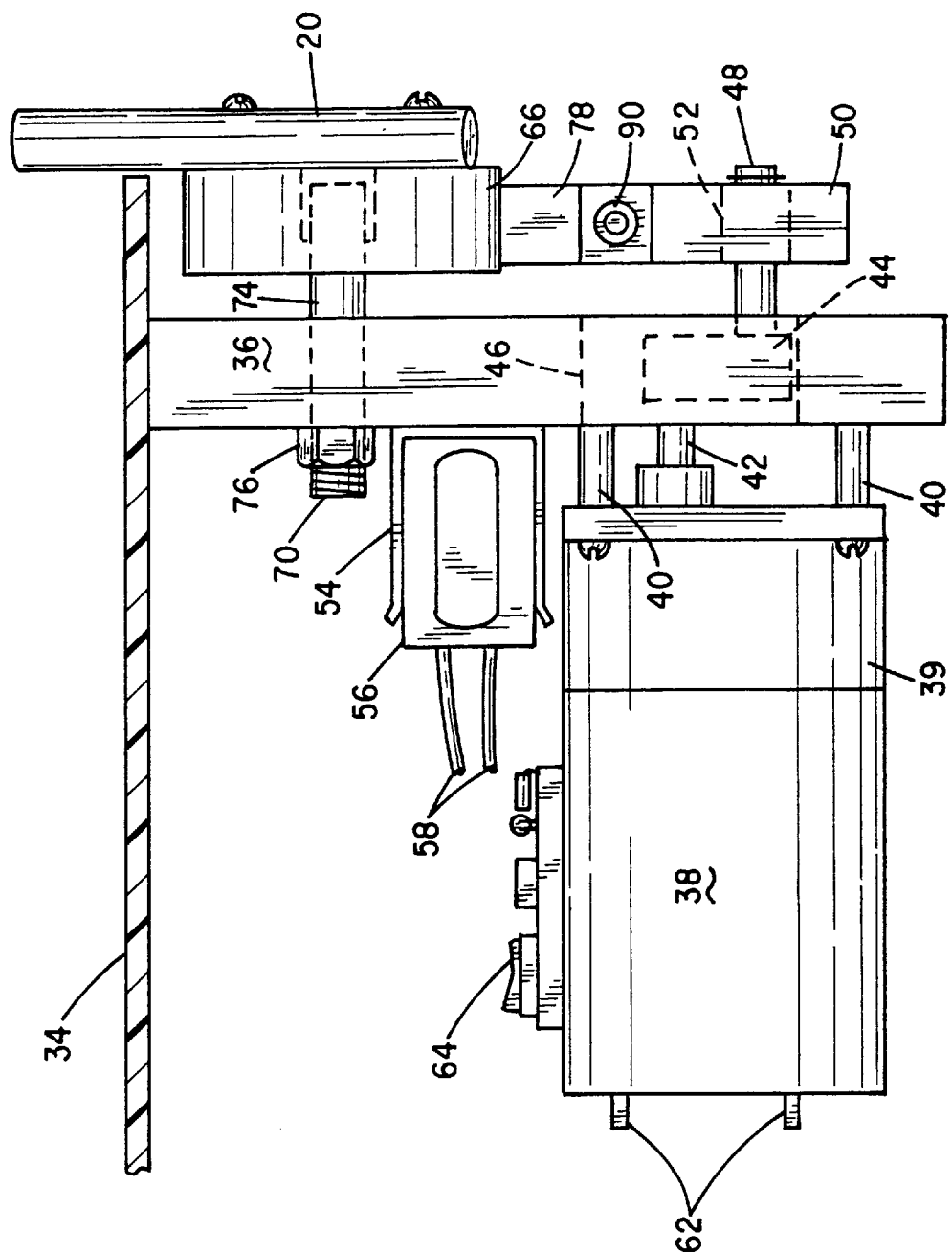
FIG. 4 is a side view of the drive system of FIG. 3.

As can best be seen in FIG. 4, the gear reduction box 39 has an output shaft 42 supporting an eccentric 44 disposed within a circular bore 46 formed in the mounting block 36. The eccentric 44, in turn, has a drive shaft 48 on which a connector block 50 is journaled by bearings 52.

Also affixed to the mounting block 36 is a spring clip 54 for releasibly holding a DC battery 56 therein. The battery leads 58 are connected in series with an ON-OFF switch 60 mounted on the cover panel 34 (FIG. 3) and to terminals 62 on the motor 38. It is also contemplated that a radio-controlled ON-OFF switch module 64 may be provided whereby the drive may be turned on and off by a hunter located in a blind a predetermined distance from the animated decoy of the present invention.

Figure 3:
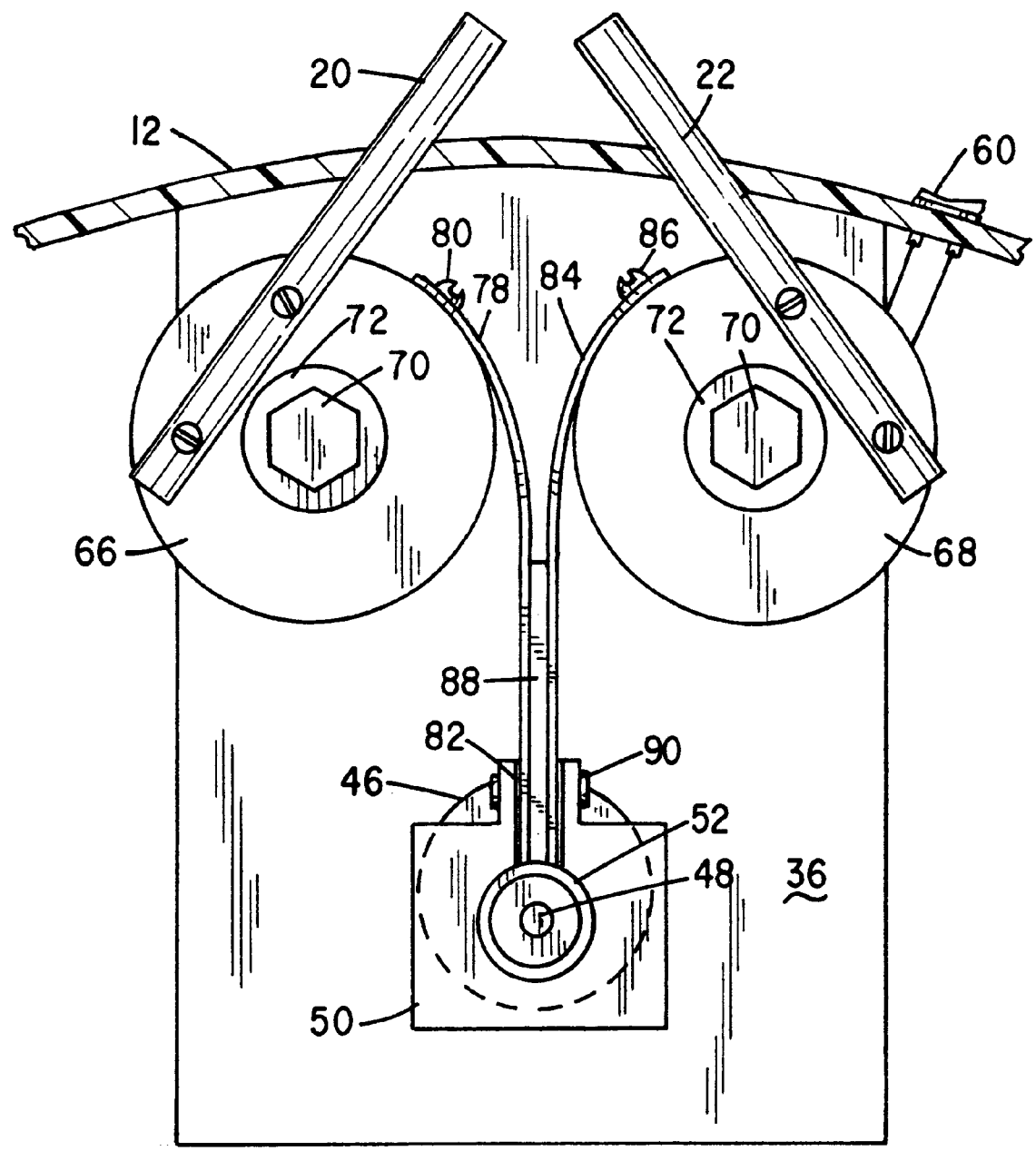
FIG. 3 is a cross-sectional view taken through the hollow body along line 3—3 in FIG. 1 showing a front view of the drive system.

Referring to FIG. 3, two wheels 66 and 68 are journaled for rotation on the mounting block 36. More specifically, bolts 70 pass through ball bearings 72 seated in the wheels 66 and 68 with the bolts passing through tubular spacers 74 (FIG. 4) and the mounting block 36 and are secured by nuts 76. The mounting pegs 20 and 22 are affixed to the front face surface of the wheels 66 and 68 and, as mentioned above, the pegs pass through slots 24 formed between the access cover panel 34 and the edge of the opening in the decoy's hollow body in which the cover panel 34 is adapted to fit.

The wheel 66 has a resilient, flat spring link member 78 affixed to its periphery by a screw 80 and the strip 78 extends downward into a slot 82 formed in a top portion of connector block 50. Likewise, a flat spring link member 84 is connected by a screw 86 to the periphery of the wheel 68 and the opposite end of this link member 84 also fits into the slot 82 in the connector block 50. Positioned between the spring-like flexible link members 78 and 84 is a generally rigid divider strip 88. The lower ends of the flexible link members 78 and 84 as well as the divider strip 88 are held in the slot 82 in the top of the connector block 50 by means of a rivet 90. The link members 78 and 84 may comprise spring steel, but preferably are fabricated from a suitable polymer, such as PEEK, having a thickness of about 0.787 mils. The divider member 88 may be a copper beryllium alloy or other suitable, relatively inflexible metal or polymer.

Having described the constructional features of the drive system of the present invention in detail, consideration will next be given its mode of operation.

OPERATION

When the manual switch 60 or the radio-controlled switch 64 is actuated to its ON position, current is delivered from the battery 56 to the motor, causing the output shaft 42 of the gear reduction 39 to rotate. Rotation of the shaft 42, in turn, causes the eccentric 44 to orbit within the circular bore 46 in the mounting block 36 causing the connector block 50 to also trace an orbital path as the eccentric shaft 48 rotates within the bearing 52. As the connector block rises and falls in traversing its orbital path, the flexible link members 78 and 84 joining the connector block 50 to the peripheral surface of the wheels 66 and 68 imparts an oscillating rotational movement of these wheels through a predetermined arc. The divider 88 operates to control the extent of bending of the flexible link members, reducing any tendency of the link members to fail through fatigue.

As the wheels 66 and 68 oscillate, the outer ends of the wing mounting pegs 20 and 22 sweep through a predetermined arc of about 23 inches in length and impart a flapping motion to the wings 16 and 18 (FIG. 1). With the type of motor and gear reduction box identified herein, the wings are made to flap at a rate of about 30 cycles per minute with a fresh battery. It is found that the weight of the wings is counter-balanced by the spring force provided by the flexible link members as they wrap about the periphery of the wheels during the orbital movement of the connector block 50. This greatly conserves the current that has to be drawn from the battery to provide the necessary torque needed to displace the wings. In fact, the drive system described was able to flap the wings for a period of 15½ hours with a drop in flapping frequency of about 20 percent and a drop in voltage of only 1.5 volts, i.e., from 9 volts to 7½ volts.

In a comparison test between the drive system of the present invention using PEET leaf spring elements as the connecting rod and a drive system using a standard style connecting rod coupled between the eccentric shaft and the wheels 66 and 68, the average current draw per cycle was decreased by ⅓ using the present invention.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself. For example, in applying the drive system of the present invention to a deer decoy, the ear appendages and/or the tail of the decoy can be made to twitch back and forth in a realistic manner.

What is claimed is:

1. An apparatus for animating a hunting decoy, the decoy including a hollow body and an appendage adapted to be moved relative to the hollow body, comprising:

(a) a mounting block affixed to a portion of the hollow body and projecting inwardly into an interior of the hollow body;

(b) an electric motor drive means attached to said mounting block, the motor drive means having an output shaft supporting an eccentrically disposed drive shaft, the drive shaft journaled for rotation in a connector block;

(c) a first wheel journaled for rotation on the mounting block;

(d) a flexible link member joining the connector block to a peripheral surface of said first wheel for reciprocal rotation of said first wheel through a predetermined arc; and (e) means for coupling the appendage to the first wheel.

2. The apparatus of claim 1 wherein the flexible link member comprises a flat leaf spring member.

3. The apparatus of claim 2 wherein the leaf spring member is a strip of a resilient polymer.

4. The apparatus of claim 3 wherein the polymer is PEEK.

5. The apparatus of claim 1 and further including:
(a) a second wheel journaled for rotation on the mounting block adjacent the first wheel;
(b) said flexible link member joining the connector block to a peripheral surface of said second wheel for reciprocal rotation of the second wheel through a predetermined arc; and
(c) means for coupling a further appendage to the second wheel.

6. The apparatus of claim 5 wherein the hunting decoy is in the form of a water fowl and the appendage and further appendage are wing members.

7. The apparatus of claim 5 wherein the flexible link member includes first and second branches individually joined to the periphery of the first and second wheels and to the connector block.

8. The apparatus of claim 7 and further including an inflexible strip affixed to the connector block and located between the first and second branches.

9. The apparatus of claim 1 wherein the electric motor is a DC motor adapted to be connected to a battery through a switch operable from a location external to the hollow body.

10. The apparatus of claim 9 wherein the switch is remotely operable.

11. The apparatus of claim 1 wherein the motor drive means is a DC motor having a gear reduction box coupled thereto, the gear reduction box having said output shaft.

* * * * *